UNITED STATES PATENT OFFICE.

JEROME JOHN COLLINS, OF SOUTHPORT, ENGLAND.

PURIFICATION OF TIN.

1,414,259. Specification of Letters Patent. Patented Apr. 25, 1922.

No Drawing. Application filed April 6, 1921. Serial No. 459,121.

*To all whom it may concern:*

Be it known that I, JEROME JOHN COLLINS, a subject of the King of Great Britain and Ireland, and resident of 9 Leicester Street, Southport, in the county of Lancaster, England, have invented certain new and useful Improvements Relating to the Purification of Tin, of which the following is a specification.

This invention relates to the purification of tin.

My invention comprises the production from the impure tin of stannous chloride by the action of stannic chloride on the impure metal in the presence of an excess of tin, the stannous chloride being dehydrated and when in a molten condition, electrolyzed whereby pure metallic tin is obtained and is drawn off from the electrolyzer, the chlorine evolved attacking the stannous chloride at the anode and producing stannic chloride which may be used in the process for obtaining stannous chloride from impure tin.

In one convenient application of my invention, a solution of stannous chloride is obtained from the impure metal by subjecting the latter to the action of stannic chloride, the stannic chloride dissolving the tin: there being always an excess of tin in the reaction vessel. The excess of tin causes the precipitation of the chlorides of arsenic and antimony as insoluble oxychlorides and also the precipitation as metal of any bismuth present. Lead chloride which is dissolved by the hot liquid precipitates when the latter is cooled.

The stannous chloride obtained as aforesaid is heated in the presence of metallic tin under a slight vacuum and out of contact with air, to drive off the water of crystallization and the anhydrous body is heated in an electrolyzer to about 260 degrees centigrade at which temperature it is molten, and an electric current passed therethrough between the anode and cathode, both of which may be made of carbon. Or the cathode may be made of cast iron and may be conveniently formed by making the electrolyzer itself of cast iron. Or the molten tin may be used as the cathode. The molten stannous chloride forms the electrolyte.

The anodes may be cooled by water jacketing or otherwise; the bath is maintained at the required temperature to keep the electrolyte in the molten or fused state, by a surrounding hot flue or in any other convenient manner.

The passage of the electric current through the electrolyte causes the decomposition of the latter, molten tin being given off at the cathode and chlorine at the anode. The chlorine attacks the stannous chloride at the anode forming stannic chloride which boils off as a gas and may be recovered in a separate vessel by condensation or absorption. The reaction between the stannic chloride and chlorine which takes place at the anode being exothermic, the heat evolved assists in maintaining the stannous chloride in a molten or fused condition. (The vessel in which the stannous chloride is dehydrated may also communicate with the vessel in which the gaseous stannic chloride is condensed or absorbed). A weak solution of stannic or stannous chloride forms a convenient absorbent for the gas. The stannic chloride thus obtained can be utilized, in the process of purifying tin, for dissolving the tin from the impure metal to yield the desired stannous chloride in the presence of an excess of tin.

The liberated molten tin is run off from the electrolyzer. The melting point of tin is lower than the fusion temperature of stannous chloride.

Having now described my invention what I claim as new and desire to secure by Letters Patent is:—

1. The process of purifying tin, consisting in producing pure stannous chloride from the impure metal by the action of stannic chloride on the latter in the presence of an excess of tin, and dehydrating, fusing and electrolyzing the stannous chloride whereby pure metallic tin and stannic chloride are obtained, as set forth.

2. The process of purifying tin as claimed in claim 1, in which the stannous chloride is dehydrated in the presence of metallic tin and out of contact with air, as set forth.

In testimony whereof I have signed my name to this specification.

JEROME JOHN COLLINS.